United States Patent
Mödinger et al.

(10) Patent No.: US 11,766,992 B2
(45) Date of Patent: Sep. 26, 2023

(54) BELT TIGHTENER

(71) Applicant: TRW Automotive GmbH, Alfdorf (DE)

(72) Inventors: Thomas Mödinger, Alfdorf (DE); Bernd Gentner, Ellwangen/Pfahlheim (DE); Martin Nuding, Waldstetten (DE)

(73) Assignee: ZF Automotive Germany GmbH, Alfdorf (DE)

( * ) Notice: Subject to any disclaimer, the term of this patent is extended or adjusted under 35 U.S.C. 154(b) by 814 days.

(21) Appl. No.: 16/332,374

(22) PCT Filed: Sep. 26, 2017

(86) PCT No.: PCT/EP2017/074323
§ 371 (c)(1),
(2) Date: Jan. 4, 2021

(87) PCT Pub. No.: WO2018/060176
PCT Pub. Date: Apr. 5, 2018

(65) Prior Publication Data
US 2021/0114551 A1    Apr. 22, 2021

(30) Foreign Application Priority Data

Sep. 29, 2016   (DE) .......................... 102016118469.1

(51) Int. Cl.
*B60R 22/46*   (2006.01)
*B60R 22/34*   (2006.01)
(52) U.S. Cl.
CPC .. *B60R 22/4628* (2013.01); *B60R 2022/3402* (2013.01); *B60R 2022/4647* (2013.01)

(58) Field of Classification Search
CPC ................ B60R 22/46; B60R 22/4628; B60R 2022/3402; B60R 2022/4647
See application file for complete search history.

(56) References Cited

U.S. PATENT DOCUMENTS

| | | | |
|---|---|---|---|
| 6,360,981 | B1 | 3/2002 | Specht |
| 7,988,084 | B2 * | 8/2011 | Lombarte ........... B60R 22/4628 242/379 |

(Continued)

FOREIGN PATENT DOCUMENTS

| | | |
|---|---|---|
| EP | 3045356 | 3/2014 |
| WO | 0114176 | 3/2001 |

*Primary Examiner* — Sang K Kim
(74) *Attorney, Agent, or Firm* — TAROLLI, SUNDHEIM, COVELL & TUMMINO L.L.P

(57) ABSTRACT

A belt retractor (10) of a seatbelt system comprises a belt tensioner (11) which is adapted to rotate a belt reel (14) of the belt retractor (10) accommodated in a belt retractor frame (12), wherein the belt retractor frame (12) is closed by a cover (16) on the tensioner side in the area of the spindle of the belt reel (14) and in the cover (16) a bearing for the belt reel (14) is provided. The cover (16) includes a first pot-shaped cover part (16a) which is mounted directly on the belt retractor frame (12) and has a side wall (24) merging into a flat portion (26). In the flat portion (26) an opening (32) is spared and a second cover part (16b) is provided which engages in the opening (32) in the first cover part (16a) and on which a bearing (40) is formed in which an end (42) of the spindle of the belt reel (14) is supported.

11 Claims, 2 Drawing Sheets

(56) References Cited

U.S. PATENT DOCUMENTS 8,584,980 B2 * 11/2013 Clute .................. B60R 22/3413
  242/379.1
2013/0327873 A1  12/2013 Gentner et al.

* cited by examiner

BELT TIGHTENER

RELATED APPLICATIONS

This application corresponds to PCT/EP2017/074323, filed Sep. 26, 2017, which claims the benefit of German Application No, 10 2016 118 469.1, filed Sep. 29, 2016, the subject matter of which are incorporated herein by reference in their entirety.

BACKGROUND OF THE INVENTION

The invention relates to a pyrotechnically driven belt tensioner for a seatbelt system.

A belt tensioner serves for reducing certain influences that will negatively affect the restraint of the vehicle occupant in a case of restraint, before the vehicle occupant starts to move forward and, where necessary, a force limiter starts to be used. Said influences include the so-called film-reel effect (belt webbing wound loosely onto the belt reel) and the belt slack (belt webbing which is loosely adjacent to the vehicle occupant). The belt tensioner reduces the belt slack and the film-reel effect within a split second by winding e.g. webbing onto a belt reel of a belt retractor and in this way tensions the webbing. Thus, the vehicle occupant can early participate in the vehicle deceleration. Moreover, the conditions for subsequent use of a force limiter are improved.

Usually, today pyrotechnically driven belt tensioners are used so that the high forces required for belt tensioning can be provided within sufficiently short time.

In a known design of a belt tensioner, there is provided a force transmitting element which is displaced by the gas pressure generated by the gas generator in a tensioner tube when the belt tensioner is activated. The force transmitting element interacts with the belt reel and rotates the latter to tension the belt.

The belt tensioner is typically arranged on a side of the belt reel from where the force transmitting element interacts indirectly with the belt reel and rotates the latter. The belt retractor frame is sealed on said side against the environment by a cover which covers one end of the spindle of the belt reel. In order to save space and components a bearing for this end of the belt reel may be provided in the tensioner-side cover.

SUMMARY OF THE INVENTION

It is the object of the invention to develop said belt retractor to the effect that a precise and trouble-free bearing of the belt reel spindle at the cover is possible.

This object is achieved by a belt retractor comprising the features of claim 1. A belt retractor of a seatbelt system comprises a belt tensioner which is adapted to rotate a belt reel of the belt retractor accommodated in a belt retractor frame, wherein the belt retractor frame is closed on the tensioner side in the area of the spindle of the belt reel by a cover and a bearing for the belt reel is provided in the cover. The cover includes a first pot-shaped cover part which is mounted directly on the belt retractor frame and which has a side wall merging into a flat portion. In the flat portion an opening is spared and a second cover part engaging in the opening in the first cover part is provided at which a bearing in which one end of the spindle of the belt reel is supported is formed. The second cover part preferably seals the belt retractor on the tensioner side against the outside so that only the tolerances of one single component, viz, the second cover part, are relevant to the bearing of the belt reel spindle.

The position of the opening allows to precisely position the second cover part and, thus, the bearing of the belt reel spindle, thus improving a central bearing of the belt reel.

The second cover part is preferably configured to be resilient to a certain extent, which allows to additionally compensate for tolerances.

A positioning structure by means of which a radial position of the second cover part relative to the first cover part is fixed may be provided at the second cover part. Also an axial position, related to the belt reel spindle, may possibly be predefined by said positioning structure. Since the first cover part adopts a fixedly predetermined position relative to the belt retractor frame, thus also the position of the bearing in the second cover part relative to the belt reel is precisely predetermined.

The positioning structure, for example, includes at least one projection which abuts on the inner edge of the opening in the first cover part. For assembly, merely the two cover parts have to be nested so as to complete the cover, wherein at the same time the bearing of the belt reel spindle is correctly positioned.

Preferably, the projection is configured to be circumferential. However, it would also be imaginable to provide only portions of the projection along the circumference.

In order to improve the position accuracy, the first cover part is advantageously made from metal, especially steel, and the second cover part is made from plastic. The first cover part may be designed for the high loads occurring when the belt is tensioned, while the second cover part has to bear less load and therefore may be fabricated from plastic, e.g. injection-molded. Accordingly, also a spring action and resilience of the cover part normal to the belt reel spindle may be defined within narrow limits.

Preferably, the bearing is formed centrally with respect to the positioning structure. The opening and the positioning structure may have a circular shape. The circumference of the complete second cover part may take any shape, however.

The bearing is an annular projection, for example, into which the end of the belt reel spindle is inserted.

For better support, portions of the second cover part may extend in the radial direction in parallel to the flat portion of the first cover part. In this embodiment, preferably the second cover part is inserted from inside through the opening in the first cover part so that the projection resting on the surface of the first cover part engages from inside in the edge of the opening in the first cover part. The portion of the second cover part exceeding the projection then abuts e.g. flatly on the flat portion of the first cover part so that no tilting forces can act upon the second cover part.

The second cover part is appropriately fastened on the first cover part. This may be e.g. a simple plug connection which is axially maintained by a bias via the belt reel spindle, or there may additionally be provided an adhesive connection, a clipping or bayonet connection or a welded connection.

Preferably the first cover part is welded to the belt retractor frame, for example by laser welding, so that a tight and load-bearing connection is given. As the second cover part bears against the first cover part, also the bearing of the belt reel is tightly held on the belt retractor frame on the tensioner side.

According to the preferred embodiment, the belt tensioner comprises a drive wheel arranged concentrically to the spindle of the belt reel, and the force transmitting element exiting the tensioner tube rotates the drive wheel. The drive wheel is connected to the belt reel, e.g. as it is positioned directly on the spindle of the belt reel, and, at the same speed of rotation at which it is rotated by the force transmitting element, also rotates the belt reel so as to wind up and tension the belt webbing. The drive wheel is preferably accommodated beneath the cover.

The force transmitting element may be formed in one piece or may consist of plural separate parts, for example a number of balls which may be coupled to each other, where appropriate. The functioning principle of the belt tensioner as well as the advantage of an intermediate element positively coupled to the stop element are equal in all cases.

When a one-piece force transmitting element is used, the latter may be, for example, an elongate, flexible, elastically and/or plastically deformable plastic component.

BRIEF DESCRIPTION OF THE DRAWINGS

Hereinafter, the invention will be described in detail by way of an example embodiment with reference to the enclosed drawings, wherein.

DESCRIPTION

Figure 1:
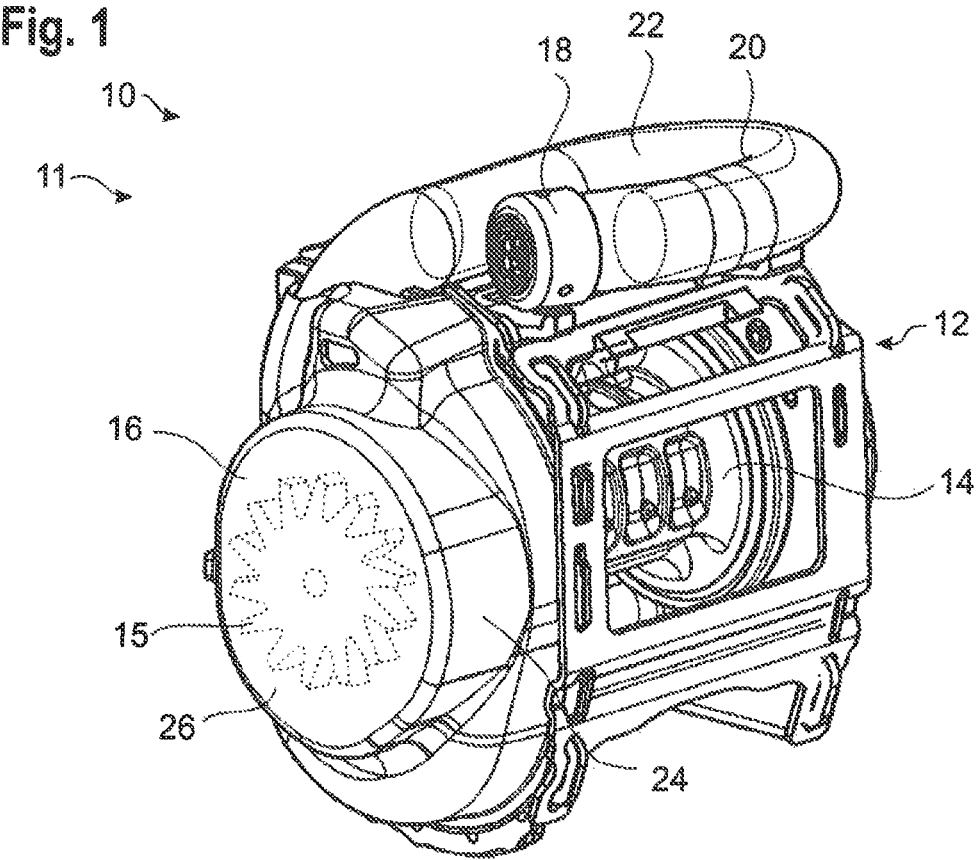
FIG. 1 shows a schematic perspective view of a belt retractor according to the invention.
Figure 2:
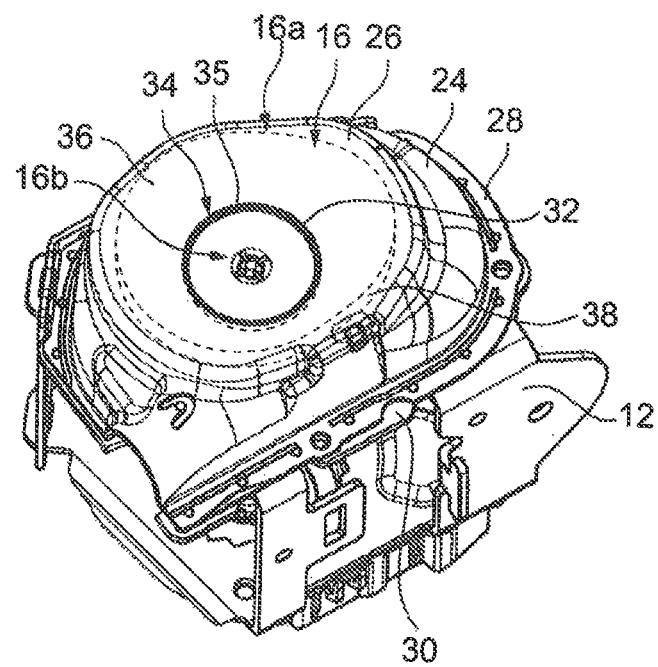
FIG. 2 shows a schematic perspective view of the belt retractor from FIG. 1 when viewed from the tensioner side.

The figures illustrate the essential parts of a belt retractor 10 comprising an integrated pyrotechnically driven belt tensioner 11. In a belt retractor frame 12 of the belt retractor 10 a belt reel 14 onto which webbing can be wound and, resp., from which webbing can be unwound (not shown here) is rotatably supported. On one side of the belt reel 14, on the left side in FIG. 1, a drive wheel 15 is provided (indicated by broken lines in FIG. 1) which is arranged concentrically to the spindle of the belt reel 14 and which is covered by a cover 16 of the belt tensioner 14 in FIG. 1. The drive wheel 15 includes an external toothing and serves for rotating the belt reel 14 via the belt tensioner 11.

The belt tensioner 11 includes a gas generator 18 arranged at one end of the tensioner tube 20 so that compressed gas generated may flow into the tensioner tube 20. In the tensioner tube 20 a force transmitting element 22 is movably arranged (cf. FIG. 1).

The force transmitting element 22 is accelerated by the gas generated by the gas generator 18, leaves the tensioner tube 20 through an open outlet end of the tensioner tube 20 and in an engaging area interacts with the drive wheel 15 so that the drive wheel 15 is rotated by squeezing past the force transmitting element 22 (not shown). The engaging area is provided directly at the one outlet end of the tensioner tube 20 so that the force transmitting element 22 impacts the drive wheel 15 with as high kinetic energy as possible.

The force transmitting element 22 in this case is an elongate component completely made from plastic material which is so flexible that it can follow the curvature of the tensioner tube 20 and is preferably plastically deformable to such extent that the drive wheel 15 can impress itself into the force transmitting element 22 and, in this way, can provide a working structure which contributes to establishing proper force transmission between the force transmitting element 22 and the drive wheel 15, while the force transmitting element 22 is moved past the drive wheel 15.

The belt tensioner 11 further includes a force limiter not shown here in detail which permits to repeatedly extend belt webbing after the belt has been tensioned.

The direction of movement of the force transmitting element 22 is defined initially by the shape of the tensioner tube 20 and then by a guiding within the cover 16 of the belt tensioner 11 not shown in detail. The tensioner tube 20 is partially strongly curved in plural spatial directions so that the direction of movement of the force transmitting element 22 is not straight.

The cover 16 is structured in two parts. A first pot-shaped cover part 16a in portions has a cylindrical side wall 24 which merges into a flat portion 26. The exact shape of the side wall depends on the concrete shape of the belt retractor frame 12 and of the belt tensioner 11. The side wall 24 ends at the end opposed to the flat portion 26 in a bent flat edge 28. The cover 16 is tightly connected to the belt retractor frame 12 via the flat edge 28, in this case by superimposed portions of the flat edge 28 and of a flat edge 30 of the belt retractor frame 12 being welded to each other.

In the flat portion 26 of the first cover part 16a a circular opening 32 is spared.

A second cover part 16b which is substantially disk-shaped and which covers the opening 32 from the inner face of the first cover part 16a engages in the opening 32.

On the outer face of the second cover part 16b a positioning structure 34 defining the radial position of the second cover part 16b relative to the first cover part 16a is formed. The positioning structure 34 in this example is a circular projection 35 which precisely abuts on the inner circumferential edge of the opening 32.

Figure 3:
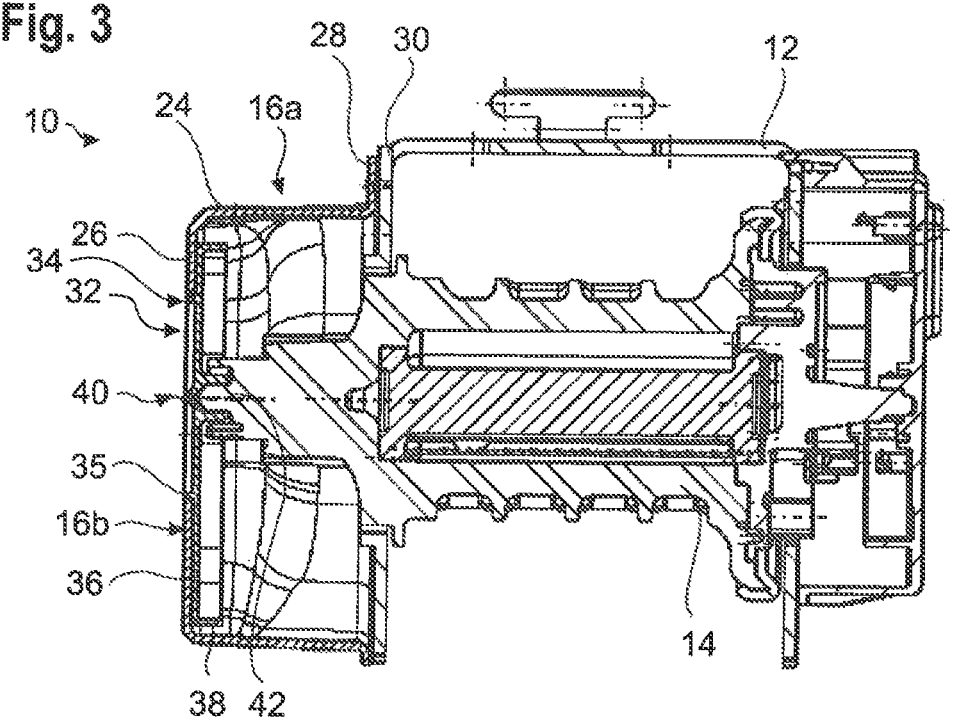
FIG. 3 shows a schematic sectional view of the belt retractor according to the invention.
Figure 4:
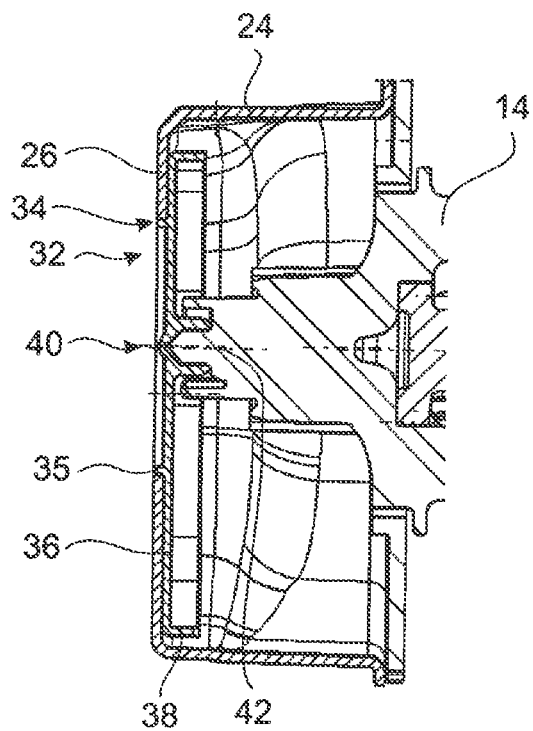
FIG. 4 shows an enlarged cutout from FIG. 3.

The second cover part 16b extends radially further outwardly beyond the projection 35 into a contact portion 36 (cf. FIGS. 3 and 4) which is fully adjacent to the inner face of the flat portion 26 of the first cover part 16a until it ends in a bent edge 38. In the area of the opening 32, however, the cover 16 is formed by the second cover part 16b only which in this area of the belt retractor 10 seals against the environment.

The bent edge 38 is spaced apart from the side wall 24 of the first cover part 16a so that the second cover part 16b and the first cover part 16a are in contact with each other only via the projection 35 and the portion 36.

The projection 35 and the opening 32 are configured so that the second cover part 16b abuts on the first cover part 16a free from play.

The outer periphery of the second cover part 16b need not be circular, its shape may be chosen depending on the shape of the belt retractor 10. However, the projection 35 preferably describes a circle, just as the opening 32.

In the center of the circle formed by the projection 35 a bearing 40 for an end 42 of the spindle of the belt reel 14 is formed. In this example, the bearing 40 takes the shape of a peripheral annular projection in which the pin-shaped end 42 of the spindle of the belt reel 14 is inserted. The end 42 of the spindle of the belt reel 14 in this case further includes projections located radially outside the pin which improve the hold of the end 42 within the bearing 40.

The first cover part 16a in this example is made from steel, whereas the second cover part 16b is made from appropriate plastic. Due to its material properties and due to its flat disk-type shape, the second cover part 16b has a certain flexibility along the axial direction of the belt reel 14. Therefore, the bearing 40 can hold the end 42 of the spindle of the belt reel at sufficient bias so that tolerances can be compensated without obstructing smooth rotatability of the belt reel 14.

The second cover part 16b may be held at the first cover part 16a exclusively by the plug connection of the projection 35 in the opening 32 as well as the bias exerted by the spindle of the belt reel 14, but it is also possible to glue or weld the radially projecting portion 36 to the inner face of the flat portion 26 of the first cover part 16a.

The invention claimed is:

1. A belt retractor (10) of a seatbelt system, comprising a belt tensioner (11) which is adapted to rotate a belt reel (14) of the belt retractor (10) accommodated in a belt retractor frame (12), wherein the belt retractor frame (12) is closed by a cover (16) on the tensioner side in the area of the belt reel (14), wherein the cover (16) includes a first pot-shaped cover part (16a) which is mounted directly on the belt retractor frame (12) and which has a side wall (24) merging into a flat portion (26), and wherein an opening (32) is spared in the flat portion (26) and a second cover part (16b) which engages in the opening (32) in the first cover part (16a) and at which a bearing (40) is formed in which an end (42) of the spindle of the belt reel (14) is supported.

2. The belt retractor according to claim 1, wherein the second cover part (16b) is configured to be resilient.

3. The belt retractor according to claim 1, wherein the second cover part (16b) has a positioning structure (34) by means of which a radial position of the second cover part (16b) relative to the first cover part (16a) is defined.

4. The belt retractor according to claim 3, wherein the positioning structure (34) has at least one projection (35) which abuts on the inner edge of the opening (32) in the first cover part (16a).

5. The belt retractor according to claim 4, wherein the projection (34) is formed to be circumferential.

6. The belt retractor according to claim 1, wherein the first cover part (16a) is made from metal and the second cover part (16b) is made from plastic.

7. The belt retractor according to claim 6, wherein the first cover part (16a) is made from steel.

8. The belt retractor according to claim 1, wherein the bearing (40) is formed centrally relative to the positioning structure (34) on the second cover part (16b).

9. The belt retractor according to claim 1, wherein portions of the second cover part (16b) extend in the radial direction in parallel to the flat portion (26) of the first cover part (16a).

10. The belt retractor according to claim 1, wherein the first cover part (16a) is welded to the belt retractor frame (12).

11. The belt retractor according to claim 1, wherein a drive wheel (15) of the belt tensioner (11) arranged concentrically to the spindle of the belt reel (14) is accommodated beneath the cover (16).

* * * * *